United States Patent
Chien et al.

(10) Patent No.: US 6,517,129 B1
(45) Date of Patent: Feb. 11, 2003

(54) LOCK DEVICE FOR AN ELECTRONIC APPLIANCE

(75) Inventors: Chung-Chi Chien, Taipei (TW); Wu-Yung Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 10/121,588

(22) Filed: Apr. 15, 2002

(51) Int. Cl.⁷ .................................. E05C 19/16
(52) U.S. Cl. ............. 292/251.5; 292/121; 292/DIG. 11; 292/340; 70/58; 361/683
(58) Field of Search ................. 361/686, 683; 248/552, 553; 312/223.1, 223.2; 292/251.5, 122, 127, 96, 102, 227, 220, 203, 244, 300, 340, 254, 121, DIG. 11; 70/14, 57, 58, 63, 67

(56) References Cited

U.S. PATENT DOCUMENTS

| | | | | |
|---|---|---|---|---|
| 5,206,790 A | * | 4/1993 | Thomas et al. | 361/681 |
| 5,335,142 A | * | 8/1994 | Anderson | 361/381 |
| 5,409,275 A | * | 4/1995 | Yoshida et al. | 292/251.5 |
| 5,465,191 A | * | 11/1995 | Nomura et al. | 361/681 |
| 5,497,296 A | * | 3/1996 | Satou et al. | 361/681 |
| 5,518,282 A | * | 5/1996 | Sawada | 292/252 |
| 5,580,107 A | * | 12/1996 | Howell | 292/95 |
| 6,076,869 A | * | 6/2000 | Chen et al. | 282/202 |
| 6,108,196 A | * | 8/2000 | Jung | 361/683 |
| 6,115,239 A | * | 9/2000 | Kim | 361/681 |
| 6,122,152 A | * | 9/2000 | Goto et al. | 361/1 |
| 6,129,395 A | * | 10/2000 | Schlesener et al. | 292/128 |
| 6,256,194 B1 | * | 7/2001 | Choi et al. | 361/683 |
| 6,275,376 B1 | * | 8/2001 | Moon | 361/683 |

* cited by examiner

*Primary Examiner*—J. J. Swann
*Assistant Examiner*—Dinesh N Melwani
(74) *Attorney, Agent, or Firm*—Bacon & Thomas, PLLC

(57) ABSTRACT

A lock device for a portable computer includes a mounting wall to be mounted on an upper housing of the computer, and parallel first and second ground flanges, each formed with a latch hole. An actuating unit has first and second actuating portions, and is normally disposed in a non-actuating position, in which the actuating portions are respectively displaced from the latch holes. A latch member is mounted on a lower housing of the computer, and is normally retracted into the lower housing. The latch member is movable to project from the lower housing and engage one of the latch holes due to magnetic attraction of a magnet of the actuating unit when the upper housing covers the lower housing. The actuating unit is operable for moving the actuating portions so as to push the latch member and disengage the same from the corresponding latch hole.

9 Claims, 16 Drawing Sheets

LOCK DEVICE FOR AN ELECTRONIC APPLIANCE

BACKGROUND OF THE INVENTION

1. Field of the Invention

The present invention relates to a lock device for an electronic appliance, such as a portable computer, with a lower housing and an upper housing hinged to the lower housing, more particularly to a lock device for locking the upper housing to the lower housing of the electronic appliance with a selected one of two opposite sides of the upper housing facing the lower housing, and to an electronic appliance incorporating the lock device.

2. Description of the Related Art

FIGS. 1 and 2 illustrate a conventional portable computer 9 which includes a lower housing 91 with a top side 912 installed with a keyboard unit, and an upper housing 92 with a screen side 922 installed with a display unit. The upper housing 92 has a lower edge portion 921 hinged to a rear edge portion 911 of the lower housing 91 such that the upper housing 92 is turnable toward and away from the top side 912 of the lower housing 91 for covering and uncovering the top side 912 of the lower housing 91. The upper housing 92 is further rotatable about a vertical rotary axis 93 when uncovered from the lower housing 91 and when disposed at an upright position perpendicular to the lower housing 91. FIG. 1 shows the portable computer 9 in an uncovering state with the screen side 922 of the upper housing 92 facing the lower housing 91. Referring to FIG. 2, when the upper housing 92 is rotated about the vertical axis 93 by 180 degrees, the back side 923 is turned forwardly to face the top side 912 of the lower housing 91.

However, a lock device provided on the portable computer 9 includes a latch member 94 mounted on the screen side 922 of the upper housing 92, and a latch engaging groove 913 formed in the top side 912 of the lower housing 91 for engaging the latch member 94. As such, the upper housing 92 can be locked to the lower housing 91 only when the screen side 922 faces the top side 912 of the lower housing 91. This undesirably limits the utility of the vertically rotatable upper housing 92 of the portable computer 9.

SUMMARY OF THE INVENTION

Therefore, the object of the present invention is to provide a lock device for locking an upper housing to a lower housing of an electronic appliance with a selected one of two opposite sides of the upper housing facing the lower housing.

According to the present invention, there is provided a lock device for an electronic appliance which includes a lower housing with a horizontal top side wall and front and rear edge portions, and an upper housing that has a lower edge portion hinged to the rear edge portion of the lower housing, an upper edge, and opposite first and second side walls disposed on opposite first and second sides of the upper housing. The upper housing is turnable relative to the lower housing with either of the first and second side walls facing the lower housing. The lock device includes a mounting unit, an actuating unit, and a latch unit. The mounting unit is adapted to be mounted on the upper housing and to be disposed at the upper edge of the upper housing. The mounting unit includes an elongated mounting wall transverse to the first and second side walls of the upper housing and having two opposite longitudinal edges, and parallel first and second flanges extending respectively along the longitudinal edges of the mounting wall and transverse to the mounting wall. The first and second flanges are adapted to be disposed respectively on the first and second sides of the upper housing. The first flange is formed with a first latch hole. The second flange is formed with a second latch hole. The actuating unit is mounted on the mounting wall, and is disposed between the first and second flanges. The actuating unit has a first actuating portion disposed adjacent to the first flange, and a second actuating portion disposed adjacent to the second flange. The actuating unit includes a magnet that is disposed between the first and second actuating portions. The actuating unit is normally disposed in a non-actuating position, in which the first actuating portion is displaced from the first latch hole, and in which the second actuating portion is displaced from the second latch hole. The latch unit is adapted to be mounted on the lower housing adjacent to the front edge portion and the top side wall. The latch unit includes a latch member made of a magnetic material. The latch member is normally disposed in an unlocking position, in which the latch member is retracted into the top side wall of the lower housing. The latch member is movable to a locking position by virtue of magnetic attraction applied by the magnet when the upper housing covers the top side wall of the lower housing. The latch member projects upwardly relative to the top side wall of the lower housing, and engages an adjacent one of the first and second latch holes when moved to the locking position. The actuating unit is operable for moving relative to the mounting wall to an actuating position, in which the first actuating portion is moved proximate to the first latch hole, and in which the second actuating portion is moved proximate to the second latch hole. The first actuating portion is moved toward the latch member, and pushes the latch member for disengaging the latch member from the first latch hole when the actuating unit is moved to the actuating position while the upper housing covers the top side wall of the lower housing with the first side wall facing the lower housing. The second actuating portion is moved toward the latch member, and pushes the latch member for disengaging the latch member from the second latch hole when the actuating unit is moved to the actuating position while the upper housing covers the top side wall of the lower housing with the second side wall facing the lower housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
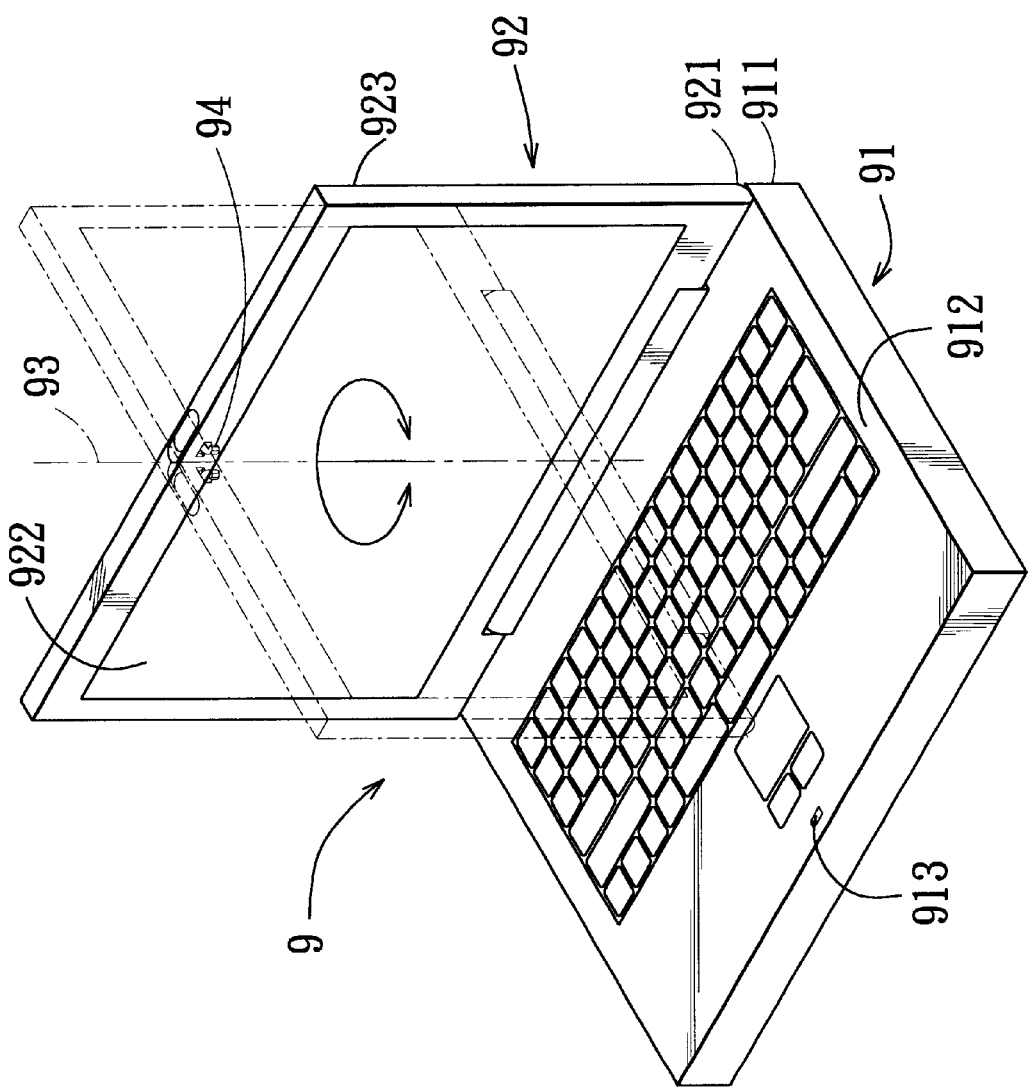
FIG. 1 illustrates a conventional portable computer in an uncovering state.
Figure 2:
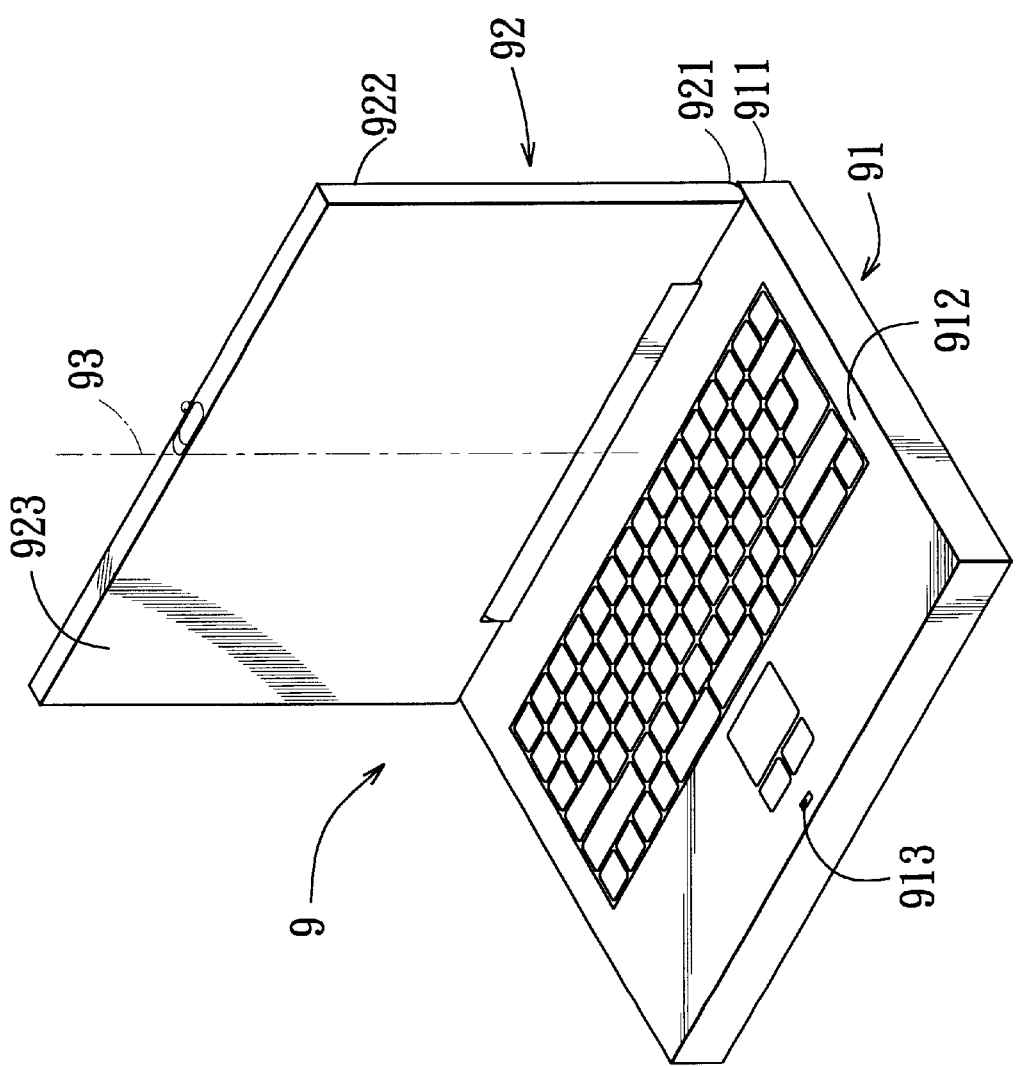
FIG. 2 shows the portable computer of FIG. 1 with an upper housing thereof turned by 180 degrees about a vertical axis.
Figure 3:
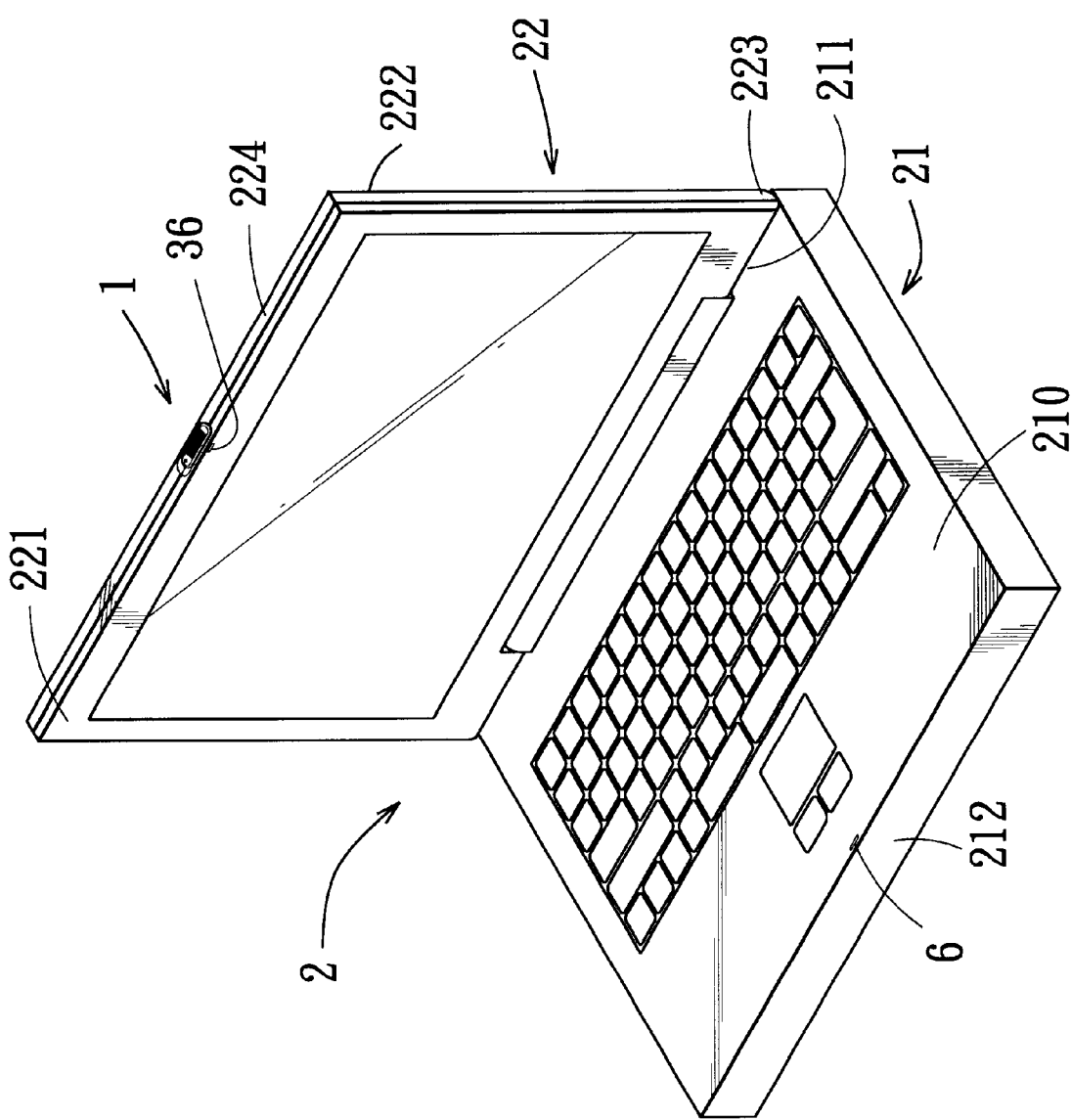
FIG. 3 is a perspective view of a portable computer incorporating a preferred embodiment of a lock device of the present invention.

Referring to FIG. 3, the preferred embodiment of the lock device 1 according to this invention is incorporated into a portable computer 2 which includes a lower housing 21 that has a top side wall 210 and that is installed with a keyboard unit on its top side, and an upper housing 22 that has a first side installed with an LCD screen, and a lower edge portion 223 hinged to a rear edge portion 211 of the lower housing 21. The upper housing 22 further has a first side wall 221 disposed on the first side, a second side wall 222 disposed on a second side opposite to the first side, and an upper edge 224 opposite to the lower edge portion 223. The upper housing 22 is rotatable about a vertical axis passing through a central part of the upper housing 22 when the upper housing 22 is in an upright position and is perpendicular to the lower housing 21. As such, a selected one of the first and second side walls 221, 222 can be oriented forwardly to face the top side wall 210 of the lower housing 21 in a known manner when the upper housing 22 is disposed in the upright position. The upper housing 22 can then be turned toward the top side wall 210 of the lower housing 21 for covering the same with the selected one of the first and second side walls 221, 222 facing the top side wall 210. The lock device 1 may be installed on other types of electronic appliances which have a horizontally disposed lower housing and an upper housing that is hinged to the lower housing and that is rotatable about a vertical axis when disposed at an upright position perpendicular to the lower housing.

Figure 4:
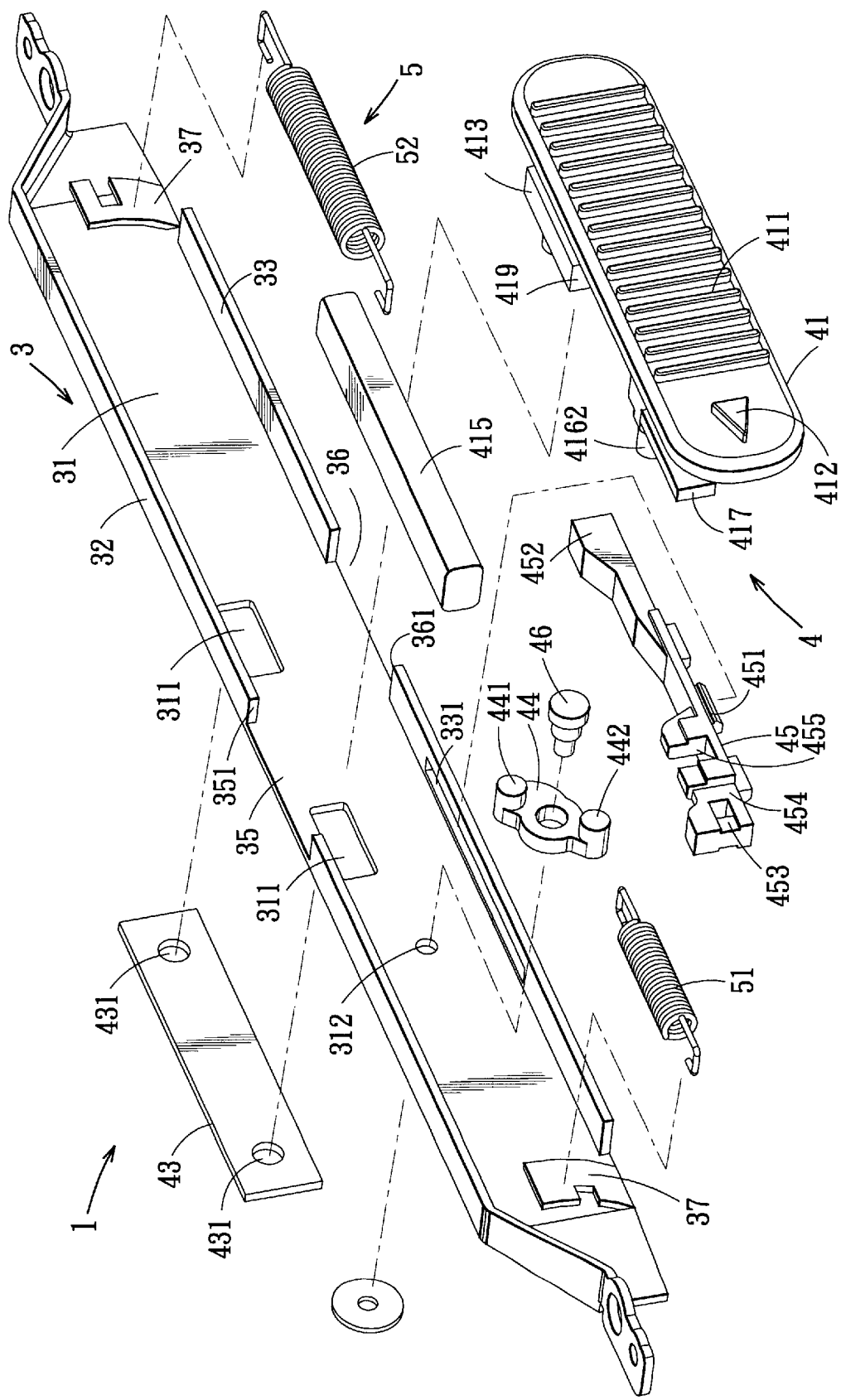
FIG. 4 is an exploded perspective view illustrating a part of the lock device of the preferred embodiment.
Figure 11:
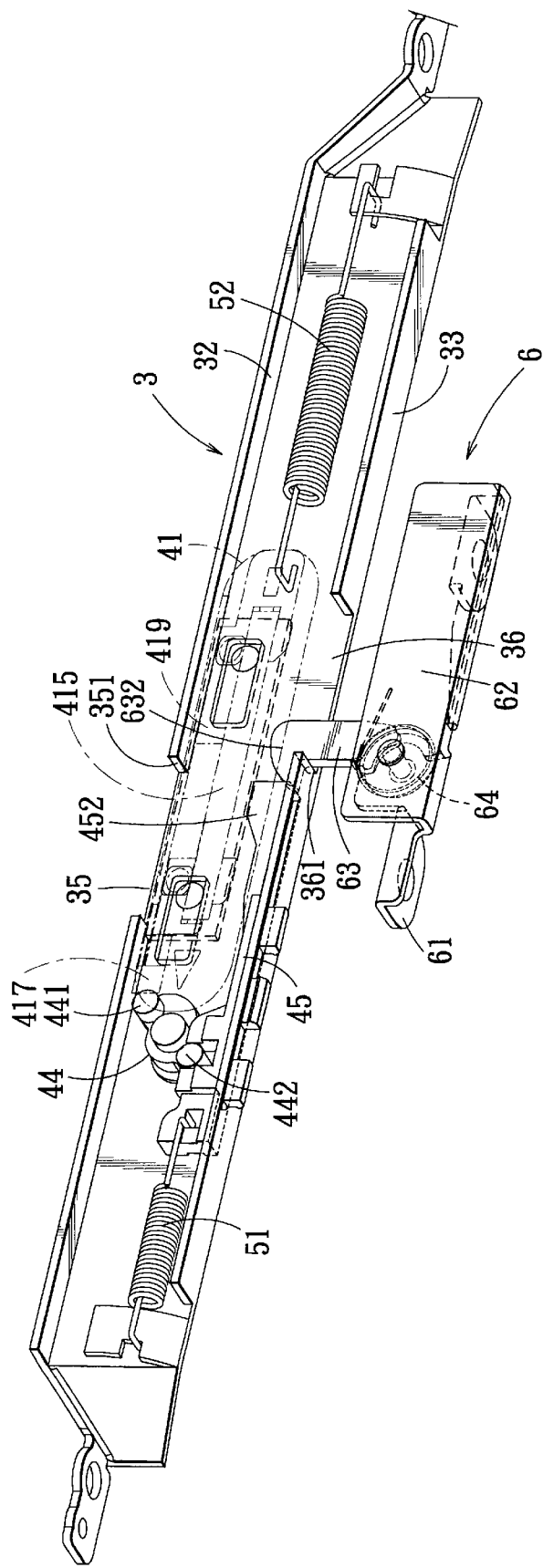
FIG. 11 illustrates the lock device of the preferred embodiment when a latch member is in a locking position and engages a first latch hole in a mounting unit of the lock device.

Referring to FIG. 4, the lock device 1 mainly includes a mounting unit 3, an actuating unit 4, a biasing unit 5, and a latch unit 6 (see FIG. 11). The mounting unit 3 is adapted to be mounted on the upper housing 22 at the upper edge 224 (see FIG. 3), and includes an elongated mounting wall 31 disposed transverse to and between the first and second side walls 221, 222, and parallel first and second flanges 33, 32 which extend respectively along two opposite longitudinal edges of the mounting wall 31 and which are transverse to the mounting wall 31. The first flange 33 is formed with a rectangular first latch hole 36, and has an engaging edge 361 formed at a periphery of the first latch hole 36. The second flange 32 is formed with a rectangular second latch hole 35, and has an engaging edge 351 formed at a periphery of the second latch hole 36. The first and second flanges 33, 32 are disposed respectively on the first and second sides of the upper housing 22. The engaging edges 361, 351 are aligned with each other in a direction transverse to a longitudinal direction of the mounting wall 31. The mounting wall 31 is formed with a pair of rectangular openings 311 that extend along the longitudinal direction thereof. The mounting wall 31 has two longitudinally opposite end portions, each of which is provided with a hook plate 37. The first flange 33 has an elongated slide groove 331 extending there along and formed therethrough.

Figure 5:
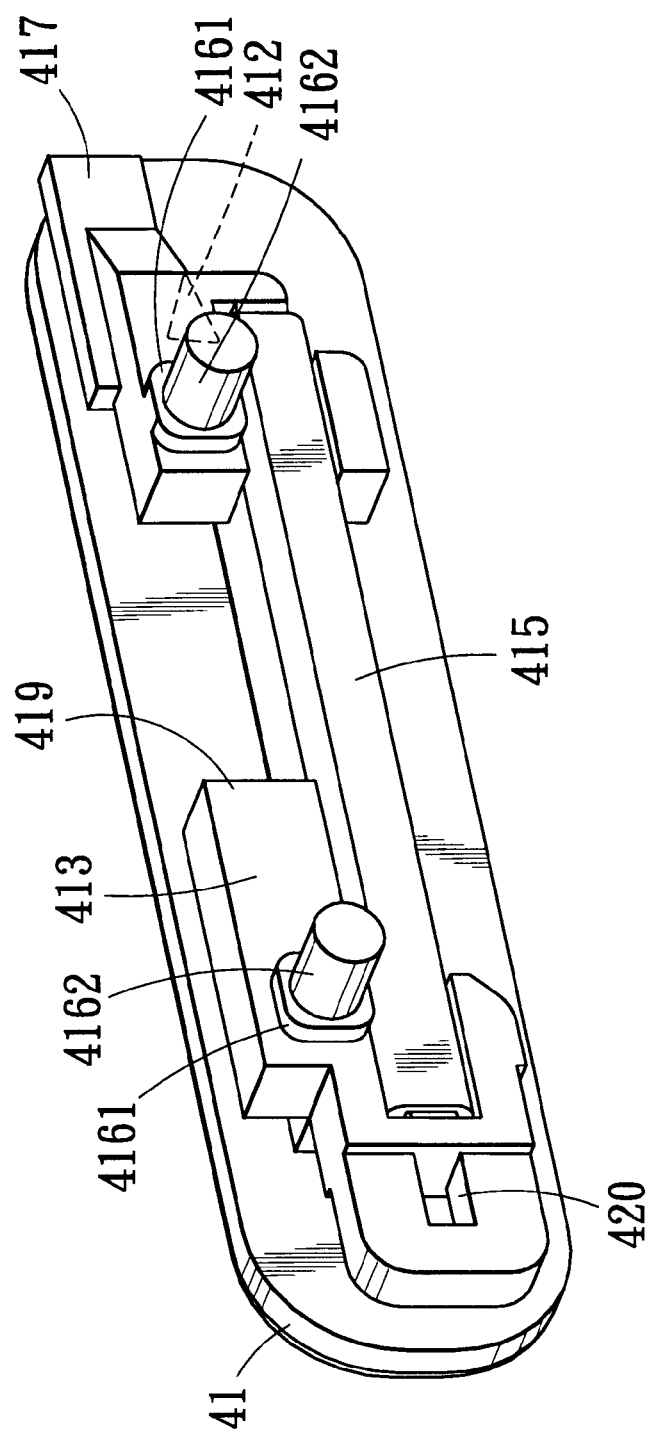
FIG. 5 shows the configuration of an operating member of the lock device of the preferred embodiment, viewed from an inner side thereof.
Figure 6:
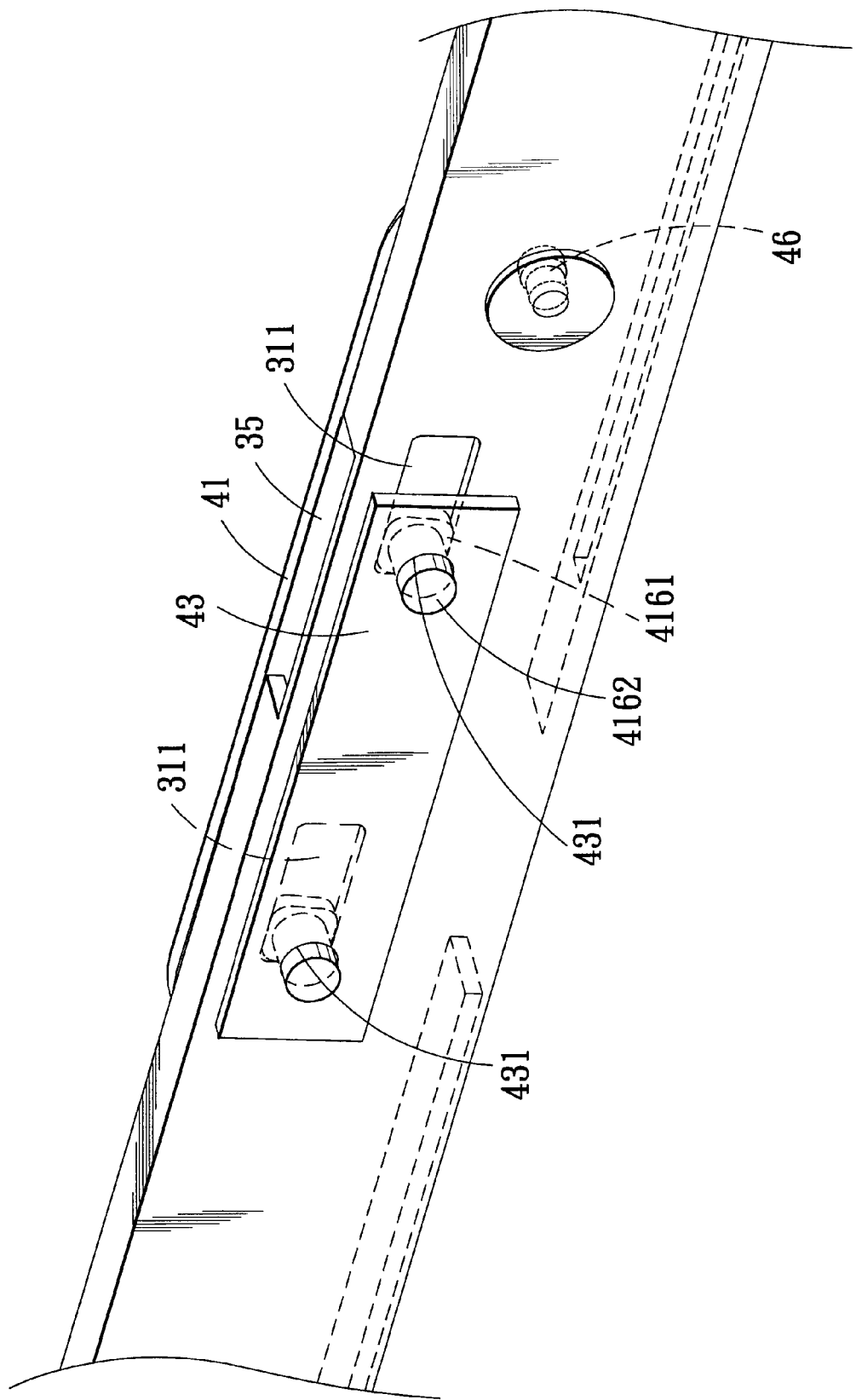
FIG. 6 illustrates how the operating member is mounted movably on a mounting wall of the preferred embodiment.

Referring to FIGS. 4 to 6, the actuating unit 4 includes an operating member 41, a rotary member 44, a first actuating member 45, a second actuating member 413, and a magnet 415. The operating member 41 has an outer surface formed with undulating grooves-and-protrusions 411 which are adapted to be in frictional contact with the finger of a user to facilitate manual operation thereof. An indicating mark 412 is provided on the outer surface to indicate operating direction of the operating member 41 for unlocking the lock device 1. The operating member 41 further has an inner surface opposite to the outer surface and formed with a push projection 417. The second actuating member 413 is fixed to the inner surface of the operating member 41. The magnet 415 is formed as an elongated bar and is a permanent magnet. The magnet 415 is disposed between the first and second actuating members 45, 413. The operating member 41 is further formed with a pair of rectangular blocks 4161 on the inner surface, each of which has a cylinder 4162 extending therefrom in a direction away from the inner surface. The rectangular blocks 4161 extend respectively through the rectangular openings 311 in the mounting wall 31, and are slidable along the rectangular openings 311 in the longitudinal direction of the mounting wall 31. The cylinders 4162 extend respectively through the rectangular openings 311 and through a pair of circular holes 431 formed in a rectangular plate 43 that is disposed behind the mounting wall 31. As shown in FIG. 6, after extending through the circular holes 431, the cylinders 4162 are fused to the rectangular plate 43 to prevent removal of the operating member 41 from the mounting wall 31, while permitting sliding movement of the rectangular blocks 4161 within the rectangular openings 311 to permit movement of the operating member 41 along the length of the mounting wall 31.

Figure 8:
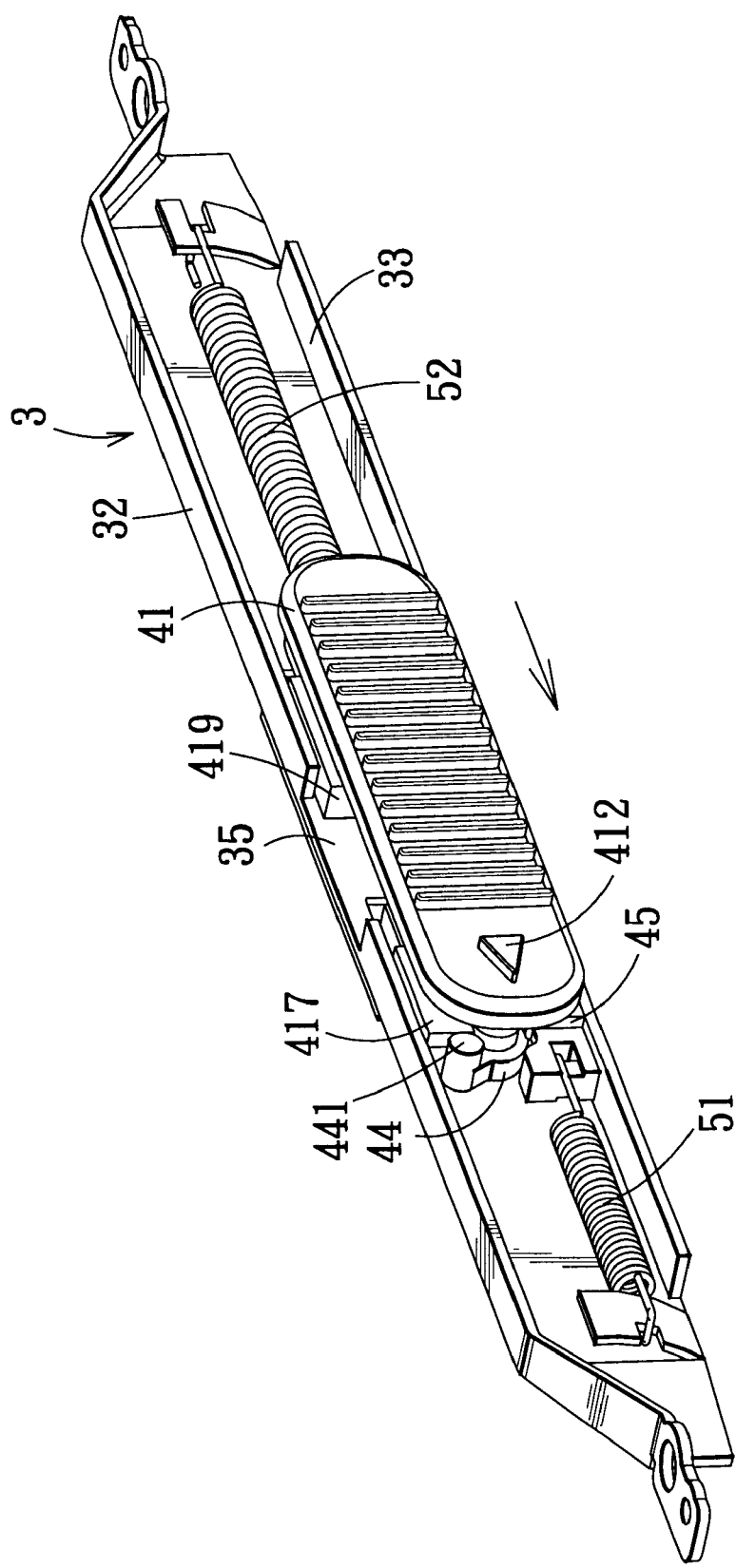
FIG. 8 illustrates the actuating unit in an actuating position.

Referring back to FIG. 4, the rotary member 44 is mounted pivotally on the mounting wall 31 by means of a pivot pin 46 which extends through the rotary member 44 and a through hole 312 formed in the mounting wall 31 such that the rotary member 44 is rotatable relative to the mounting wall 31 about an axis of the pivot pin 46 that is perpendicular to the mounting wall 31. The rotary member 44 has first and second ends 441, 442 which are opposite to each other with respect to the axis of the pivot pin 46. The first end 441 of the rotary member 44 is disposed adjacent to the push projection 417 of the operating member 41 and can be pushed by the push projection 417 to result in counterclockwise rotation of the rotary member 44 when the operating member 41 is operated in an operating direction indicated by the indicating mark 412, as shown in FIG. 8.

Referring again FIG. 4, the first actuating member 45 is disposed adjacent to the first flange 33 of the mounting unit 3. The first actuating member 45 is elongated in shape and has several slide projections 451 which extend through the slide groove 331 formed in the first flange 33 of the mounting unit 3 such that the first actuating member 45 is slidable along the longitudinal direction of the mounting unit 3. The first actuating member 45 has a first end portion 454 formed with an engaging groove 455, and a second end portion that is opposite to the first end portion 454 in the longitudinal direction of the mounting unit 3 and that constitutes a first actuating portion 452. The second end 442 of the rotary member 44 extends into the engaging groove 455 and engages the first end portion 454 of the first actuating member 45 such that, when the first end 441 of the rotary member 44 is pushed by the push projection 417 due to operation of the operating member 41 in the operating direction to cause counterclockwise rotation of the rotary member 44, the second end 442 of the rotary member 44 is able to push the first actuating member 45 in a direction opposite to the operating direction so as to move the first actuating portion 452 toward and proximate to the first latch hole 36. The second actuating member 413 has one end that defines a second actuating portion 419 and that is disposed adjacent to the second flange 32 of the mounting unit 3.

A biasing unit 5 includes a first tension spring 52 and a second tension spring 51. The first tension spring 52 has one end engaging one of the hook plates 37 on the mounting unit 3, and an opposite end engaging a spring engaging groove 420 (see FIG. 5) formed in the inner surface of the operating member 41 for biasing the operating member 41 to move in a direction opposite to the operating direction indicated by the indicating mark 412 for moving to a non-actuating position, in which the second actuating portion 419 of the second actuating member 413 is displaced from the second latch hole 35 and in which the push projection 417 is spaced-apart from the first end 441 of the rotary member 44. The second tension spring 51 has one end engaging another one of the hook plates 37, and another end engaging a spring engaging groove 453 formed in the first end portion 454 of the first actuating member 45 for biasing the first actuating member 45 to move in the operating direction indicated by the indicating mark 412 to the non-actuating position, in which the first actuating portion 452 is further displaced from the first latch hole 36.

Figure 7:
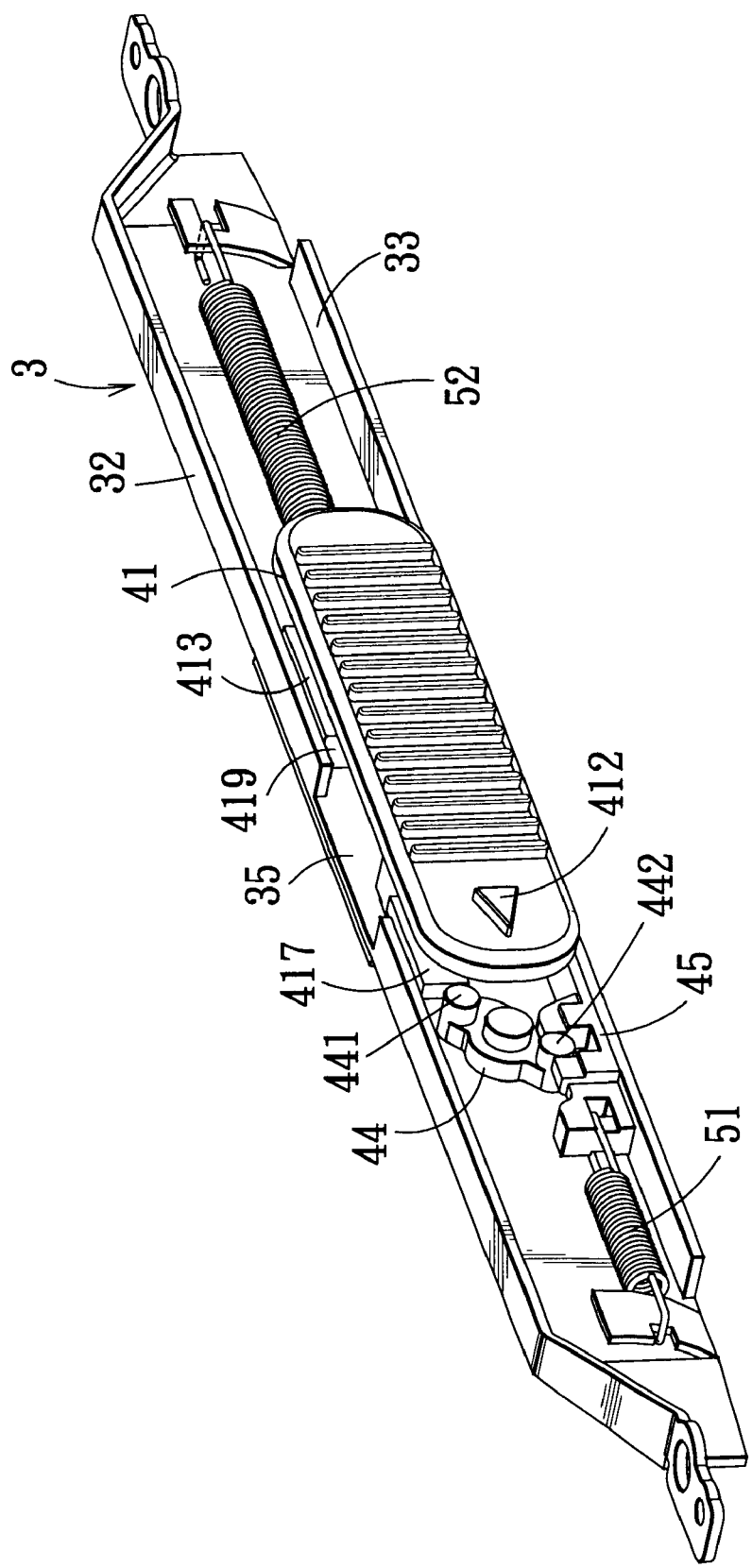
FIG. 7 illustrates an actuating unit of the lock device in a non-actuating position.

As such, with the action of the first and second tension springs 52, 51, the actuating unit 4 is normally disposed in the non-actuating position, in which the first actuating portion 452 on the first actuating member 45 is displaced from the first latch hole 36, and in which the second actuating portion 419 on the second actuating member 413 is displaced from the second latch hole 35, as shown in FIGS. 7 and 11.

Figure 9:
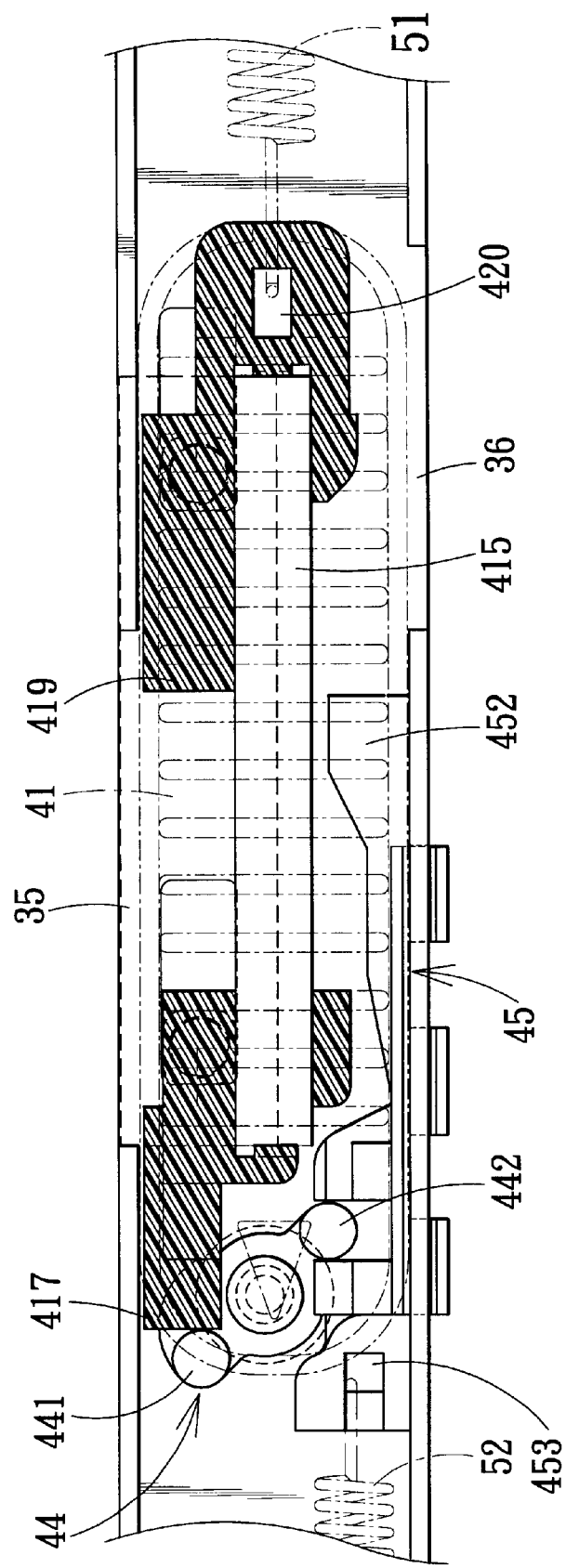
FIG. 9 is a fragmentary, partly-sectioned, elevational view showing the actuating unit in the actuating position.

Referring to FIGS. 8 and 9, when the operating member 41 is pushed manually to move in the operating direction indicated by the indicating mark 412, the push projection 417 is moved together with the operating member 41 in the operating direction and pushes the first end 441 of the rotary member 44 to result in counterclockwise rotation of the rotary member 44. Since the second end 442 of the rotary member 44 engages the first end portion 454 of the first actuating member 45, the first actuating member 45 is thus pushed by the second end 442 of the rotary member 44 to move in the direction opposite to the operating direction so as to move the first actuating portion 452 toward and proximate to the first latch hole 36.

Figure 10:
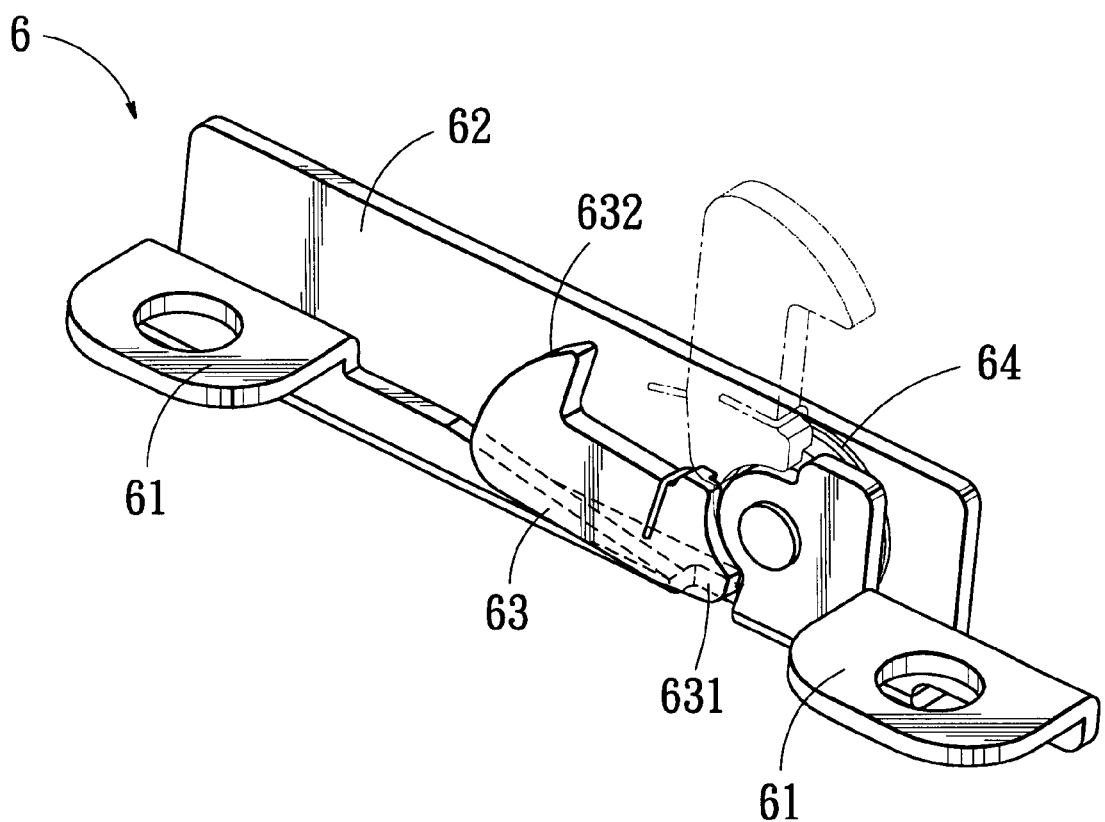
FIG. 10 is a perspective view illustrating a latch unit of the lock device of the preferred embodiment.

Referring to FIG. 10, the latch unit 6 is mounted in the lower housing 21 (see FIG. 3) adjacent to the top side wall 210 and to a front edge portion 212 of the lower housing 21 by means of a pair of fastening plates 61 that are formed with fastener holes. The latch unit 6 includes an upright base wall 62 with the fastener plates 61 extending therefrom, a latch member 63 mounted pivotally on the base wall 62 so as to be pivotable about a horizontal axis transverse to the base wall 62 between an upright locking position (shown in phantom lines in FIG. 10) and a horizontal unlocking position, and a biasing member, in the form of a torsion spring 64, for biasing the latch member 63 to the unlocking position. The latch member 63 is made of a magnetic material, and has a mounting end 631 mounted pivotally to the base wall 62, and thus to the lower housing 21, and a hooked locking end 632 opposite to the mounting end 631. In the unlocking position, the latch member 63 is retracted into the top side wall 210 of the lower housing 21 (see FIG. 3). In the locking position, the latch member 63 projects upwardly relative to the top side wall 210 of the lower housing 21.

Figure 12:
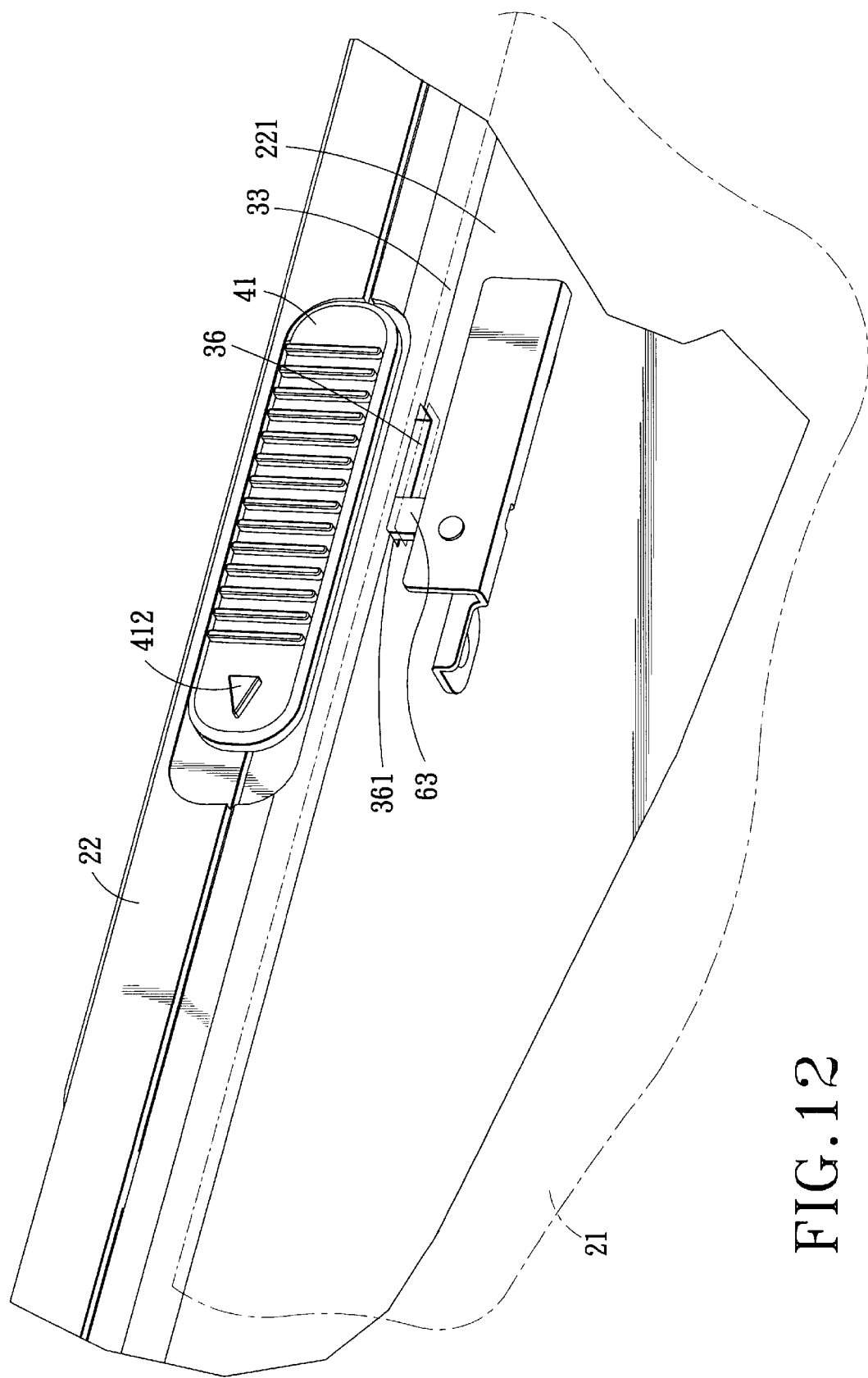
FIG. 12 is a fragmentary perspective view of the portable computer incorporating the lock device of the preferred embodiment, with the latch member being disposed in the locking position and engaging the first latch hole.

Referring to FIGS. 11 and 12, in use, when the upper housing 22 of the portable computer 2 is turned toward the lower housing 21 so that the top side wall 210 of the lower housing 21 is covered by a selected one of the first and second side walls 221, 222, the magnet 415 on the operating member 41 is moved to be disposed above the latch member 63. At this time, the latch member 63 is attracted by the magnet 415, and is moved pivotally thereby to the upright locking position against biasing action of the torsion spring 64. The locking end 632 of the latch member 63 thus extends into an adjacent one of the first and second latch holes 36, 35 and engages the engaging edge 361, 351 of a corresponding one of the first and second flanges 33, 32 at the periphery of the corresponding one of the first and second latch holes 36, 35, thereby locking the upper housing 22 to the lower housing 21.

Figure 13:
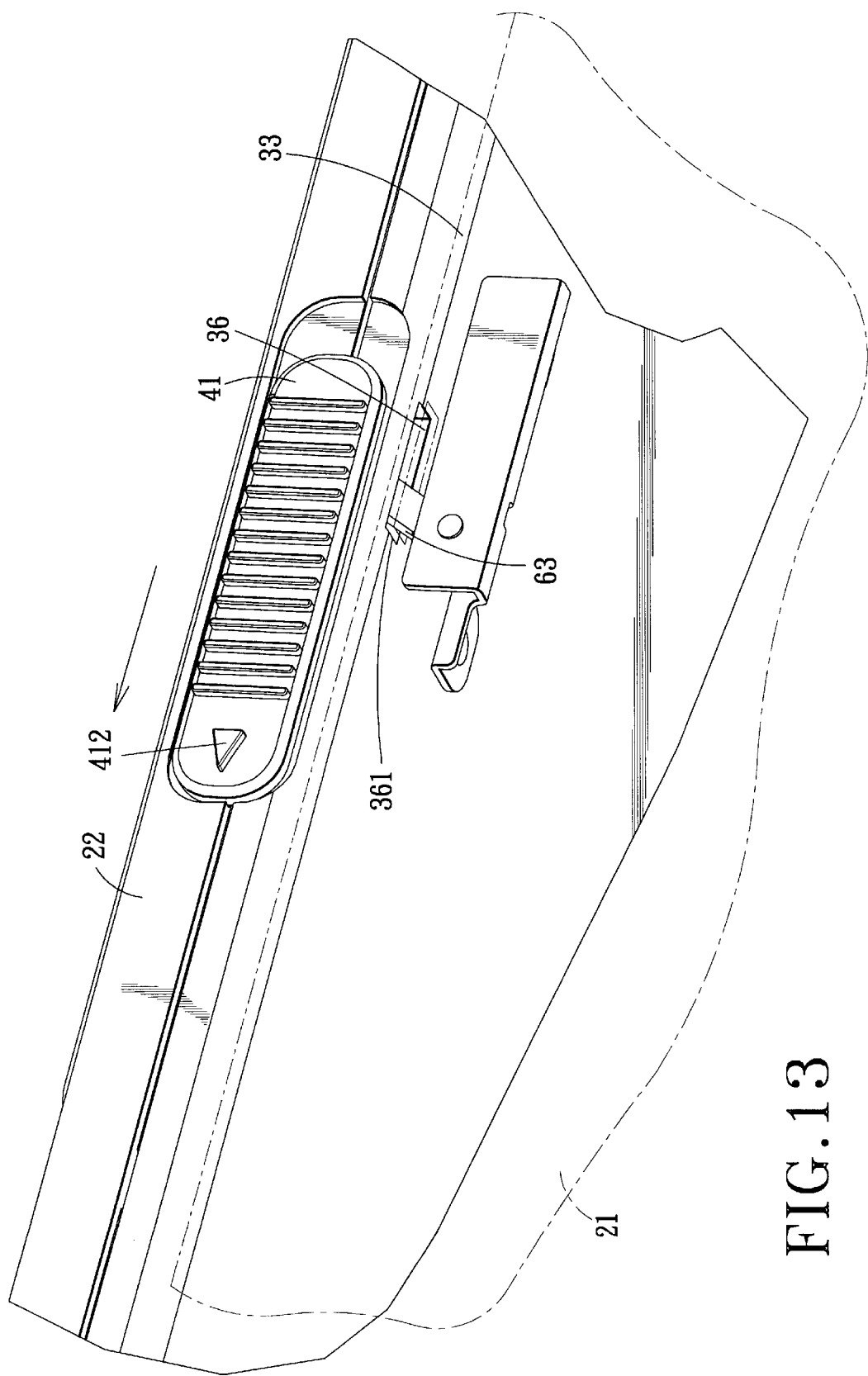
FIG. 13 illustrates an unlocking operation of the lock device, where the operating member is operated to move from the non-actuating position toward the actuating position so as to disengage the latch member from the first latch hole.

Referring to FIGS. 8, 11 and 13, to unlock the lock device 1 for unlocking the upper housing 22 from the lower housing 21, the operating member 41 is operated manually in the operating direction indicated by the indicating mark 412 for moving from the non-actuating position to the actuating position. At this time, the push projection 417 is moved with the operating member 41 in the operating direction, and pushes the first end 441 of the rotary member 44 to rotate the rotary member 44 counterclockwise and to enable the second end 442 of the rotary member 44 to push the first actuating member 45 in the direction opposite to the operating direction for moving the first actuating portion 452 toward and proximate to the first latch hole 36. Simultaneously, the second actuating member 413 is moved with the operating member 41 in the operating direction toward and proximate to the second latch hole 35.

Referring to FIGS. 11 and 12, in case the upper housing 22 covers the lower housing 21 with the first side wall 221 thereof and the first flange 33 of the mounting unit 3 facing downwardly, operation of the operating member 41 in the operating direction enables the first actuating portion 452 to move toward the latch member 63 and push the locking end 632 of the latch member 63 away from the engaging edge 361 of the first flange 33 for disengaging the latch member 63 from the first latch hole 36 and from the first flange 33 so as to enable the latch member 63 to pivot back to the unlocking position by virtue of the biasing action of the torsion spring 64, as shown in FIG. 13.

Figure 14:
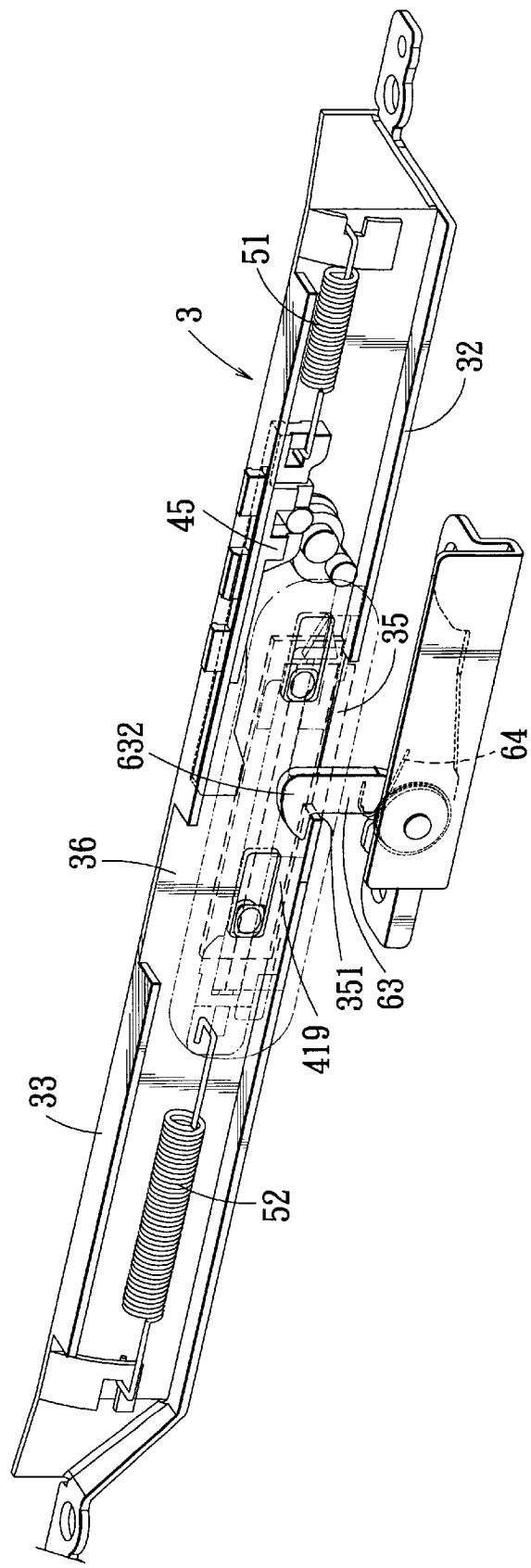
FIG. 14 illustrates the lock device of the preferred embodiment when the latch member is in the locking position and engages a second latch hole in the mounting unit of the lock device.
Figure 15:
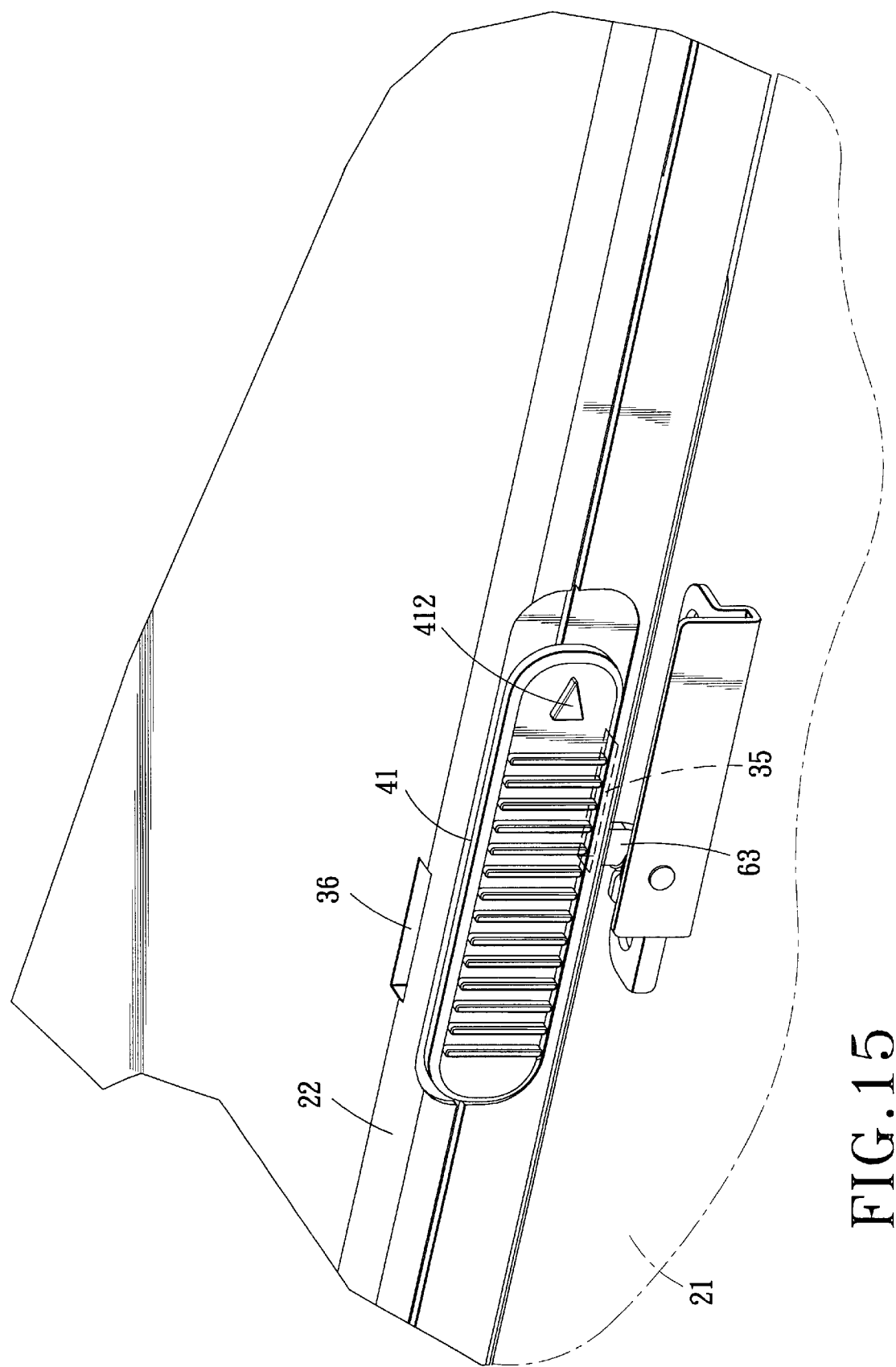
FIG. 15 is a fragmentary perspective view of the portable computer incorporating the lock device of the preferred embodiment, with the latch member being disposed in the locking position and engaging the second latch hole.
Figure 16:
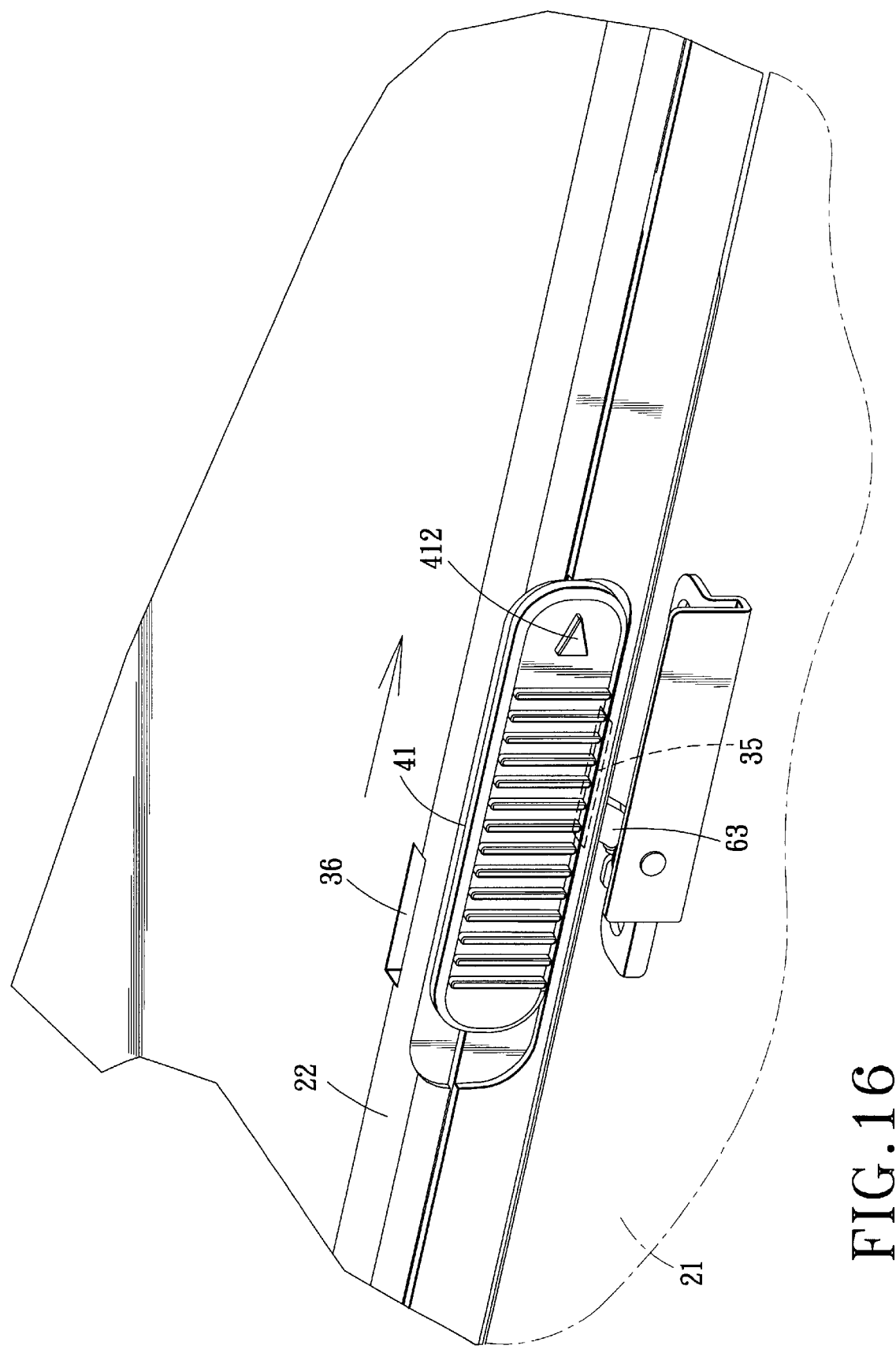
FIG. 16 illustrates another unlocking operation of the lock device, where the operating member is operated to move from the non-actuating position toward the actuating position so as to disengage the latch member from the second latch hole.

Referring to FIGS. 14 and 15, in case the upper housing 22 covers the lower housing 21 with the second side wall 222 thereof and the second flange 32 of the mounting unit 3 facing downwardly, operation of the operating member 41 in the operating direction enables the second actuating portion 419 to move toward the latch member 63 and push the locking end 632 of the latch member 63 away from the engaging edge 351 of the second flange 32 for disengaging the latch member 63 from the second latch hole 35 and from the second flange 32 so as to enable the latch member 63 to pivot back to the unlocking position by virtue of the biasing action of the torsion spring 64, as shown in FIG. 16.

It has thus been shown that, with the use of the lock device 1 of the present invention, the upper housing 22 can be locked to the lower housing 21 with either of the first and second side walls 221, 222 facing downwardly. By simply operating the operating member 41 manually in the direction indicated by the indicating mark 412, the latch member 63 is moved by either of the first and second actuating portions 45, 419 for disengaging from the corresponding latch hole 35, 36, thereby unlocking the upper housing 22 from the lower housing 21.

While the present invention has been described in connection with what is considered the most practical and preferred embodiment, it is understood that this invention is not limited to the disclosed embodiment but is intended to cover various arrangement included within the spirit and scope of the broadest interpretation so as to encompass all such modifications and equivalent arrangements.

We claim:

1. A lock device for an electronic appliance which includes a lower housing with a horizontal top side wall and front and rear edge portions, and an upper housing that has a lower edge portion hinged to the rear edge portion of the lower housing, an upper edge, and opposite first and second side walls disposed on opposite first and second sides of the upper housing, the upper housing being turnable relative to the lower housing with either of the first and second side walls facing the lower housing, said lock device comprising:

a mounting unit adapted to be mounted on the upper housing and to be disposed at the upper edge of the upper housing, said mounting unit including an elongated mounting wall transverse to the first and second side walls of the upper housing and having two opposite longitudinal edges, and parallel first and second flanges extending respectively along said longitudinal edges of said mounting wall and transverse to said mounting wall, said first and second flanges being adapted to be disposed respectively on the first and second sides of the upper housing, said first flange being formed with a first latch hole, said second flange being formed with a second latch hole;

an actuating unit mounted on said mounting wall and disposed between said first and second flanges, said actuating unit having a first actuating portion disposed adjacent to said first flange, and a second actuating portion disposed adjacent to said second flange, said actuating unit including a magnet that is disposed between said first and second actuating portions, said actuating unit being normally disposed in a non-actuating position, in which said first actuating portion is displaced from said first latch hole, and in which said second actuating portion is displaced from said second latch hole; and a latch unit adapted to be mounted on the lower housing adjacent to the front edge portion and the top side wall, said latch unit including a latch member made of a magnetic material, said latch member being normally disposed in an unlocking position, in which said latch member is retracted into the top side wall of the lower housing, said latch member being movable to a locking position by virtue of magnetic attraction applied by said magnet when the upper housing covers the top side wall of the lower housing, said latch member projecting upwardly relative to the top side wall of the lower housing and engaging an adjacent one of said first and second latch holes when moved to the locking position;

said actuating unit being operable for moving relative to said mounting wall to an actuating position, in which said first actuating portion is moved proximate to said first latch hole and in which said second actuating portion is moved proximate to said second latch hole, said first actuating portion being moved toward said latch member and pushing said latch member for disengaging said latch member from said first latch hole when said actuating unit is moved to said actuating position while the upper housing covers the top side wall of the lower housing with the first side wall facing the lower housing, said second actuating portion being moved toward said latch member and pushing said latch member for disengaging said latch member from said second latch hole when said actuating unit is moved to said actuating position while the upper housing covers the top side wall of the lower housing with the second side wall facing the lower housing.

2. The lock device as claimed in claim 1, further comprising a biasing unit for biasing said actuating unit to the non-actuating position.

3. The lock device as claimed in claim 2, wherein said actuating unit further includes:

an operating member movable between the non-actuating position and the actuating position, said operating member being formed with a push projection;

a rotary member mounted pivotally on said mounting wall so as to be rotatable about an axis perpendicular to said mounting wall, said rotary member having a first end and a second end opposite to said first end with respect to the axis, said push projection on said operating member pushing said first end of said rotary member when said operating member is moved to the actuating position, thereby resulting in rotation of said rotary member and in corresponding movement of said second end of said rotary member;

a first actuating member movable between the non-actuating position and the actuating position, said first actuating member having a first end portion which engages said second end of said rotary member, and an opposite second end portion which constitutes said first actuating portion; and a second actuating member fixed to said operating member and formed with said second actuating portion;

said biasing unit including a first tension spring having one end connected to said mounting wall and another end connected to said operating member for biasing said operating member to the non-actuating position, said operating member being manually operable against biasing action of said first tension spring for moving from the non-actuating position to the actuating position, and a second tension spring having one end connected to said mounting wall and another end connected to said first end portion of said first actuating member for biasing said first actuating member to the non-actuating position, said first actuating member being pushed by said second end of said rotary member against biasing action of said second tension spring when said operating member is moved to the actuating position.

4. The lock device as claimed in claim 3, wherein said operating member has an outer surface provided with an indicating mark to indicate the direction in which said operating member can be operated for moving from the non-actuating position to the actuating position.

5. The lock device as claimed in claim 1, wherein said latch unit further includes a biasing member for biasing said latch member to the unlocking position.

6. The lock device as claimed in claim 5, wherein said biasing member is a torsion spring.

7. The lock device as claimed in claim 1, wherein said latch member has a mounting end adapted to be mounted pivotally to the lower housing, and a hooked locking end opposite to said mounting end and capable of hooking at one of said first and second flanges in a corresponding one of said first and second latch holes when the upper housing covers the lower housing.

8. An electronic appliance comprising:

a lower housing having a horizontal top side wall and front and rear edge portions;

an upper housing having a lower edge portion hinged to said rear edge portion of said lower housing, an upper edge, and opposite first and second side walls disposed on opposite first and second sides of said upper housing, said upper housing being turnable relative to said lower housing with either of said first and second side walls facing said top side wall of said lower housing; and a lock device including:

a mounting unit mounted on said upper housing and disposed adjacent to said upper edge of said upper housing, said mounting unit including an elongated mounting wall transverse to said first and second side walls of said upper housing and having two opposite longitudinal edges, and parallel first and second flanges extending respectively along said longitudinal edges of said mounting wall and transverse to said mounting wall, said first and second flanges being disposed respectively on said first and second sides of said upper housing, said first flange being formed with a first latch hole, said second flange being formed with a second latch hole;

an actuating unit mounted on said mounting wall and disposed between said first and second flanges, said actuating unit having a first actuating portion disposed adjacent to said first flange, and a second actuating portion disposed adjacent to said second flange, said actuating unit including magnet that is disposed between said first and second actuating portions, said actuating unit being normally disposed in a non-actuating position, in which said first actuating portion is displaced from said first latch hole, and in which said second actuating portion is displaced from said second latch hole; and a latch unit mounted on said lower housing adjacent to said top side wall and said front edge portion, said latch unit including a latch member made of a magnetic material, said latch member being normally disposed in an unlocking position, in which said latch member is retracted into said top side wall of said lower housing, said latch member being movable to a locking position by virtue of magnetic attraction applied by said magnet when said upper housing covers said top side wall of said lower housing, said latch member projecting upwardly relative to said top side wall of said lower housing and engaging an adjacent one of said first and second latch holes when moved to said locking position;

said actuating unit being operable for moving relative to said mounting wall to an actuating position, in which said first actuating portion is moved proximate to said first latch hole, and in which said second actuating portion is moved proximate to said second latch hole, said first actuating portion being moved toward said latch member and pushing said latch member for disengaging said latch member from said first latch hole when said actuating unit is moved to said actuating position while said upper housing covers said top side wall of said lower housing with said first side wall facing said lower housing, said second actuating portion being moved toward said latch member and pushing said latch member for disengaging said latch member from said second latch hole when said actuating unit is moved to said actuating position while said upper housing covers said top side wall of said lower housing with said second side wall facing said lower housing.

9. The electronic appliance as claimed in claim 8, wherein said electronic appliance is a portable computer, said top side wall of said lower housing being provided with a keyboard unit, said upper housing being provided with a display unit.

* * * * *